US012494065B2

(12) United States Patent
Fox (10) Patent No.: US 12,494,065 B2
(45) Date of Patent: Dec. 9, 2025

(54) EFFICIENT COLLISION DETECTION AND ALERTING MODULE AND METHOD

(71) Applicant: Joshua Fox, Scarborough, ME (US)

(72) Inventor: Joshua Fox, Scarborough, ME (US)

(73) Assignee: Survue, Inc., Scarborough, ME (US)

( * ) Notice: Subject to any disclaimer, the term of this patent is extended or adjusted under 35 U.S.C. 154(b) by 526 days.

(21) Appl. No.: 17/713,116

(22) Filed: Apr. 4, 2022

(65) Prior Publication Data

US 2025/0078520 A1    Mar. 6, 2025

Related U.S. Application Data

(60) Provisional application No. 63/170,709, filed on Apr. 5, 2021.

(51) Int. Cl.
| | | |
|---|---|---|
| *G06V 20/58* | (2022.01) | |
| *G06T 7/20* | (2017.01) | |
| *G06T 7/70* | (2017.01) | |
| *G08G 1/16* | (2006.01) | |

(52) U.S. Cl.
CPC .............. *G06V 20/58* (2022.01); *G06T 7/20* (2013.01); *G06T 7/70* (2017.01); *G08G 1/166* (2013.01); *G06T 2207/30252* (2013.01)

(58) Field of Classification Search
CPC .............. G06V 20/58; G06T 7/20; G06T 7/70
See application file for complete search history.

(56) References Cited

U.S. PATENT DOCUMENTS

| | | | |
|---|---|---|---|
| 9,718,405 B1 * | 8/2017 | Englander | ............... B60R 1/008 |
| 10,377,308 B2 | 8/2019 | Savaresi et al. | |
| 10,589,669 B2 | 3/2020 | Tatsumi et al. | |
| 10,899,408 B2 | 1/2021 | Gilles | |
| 11,170,650 B2 | 11/2021 | Cooper | |

(Continued)

FOREIGN PATENT DOCUMENTS

| | | | |
|---|---|---|---|
| CN | 106156725 A | * | 11/2016 |
| EP | 3636529 A1 | | 4/2020 |

OTHER PUBLICATIONS

B. Pribyl and P. Zemcik, "Simple Single View Scene Calibration," Lecture Notes in Computer Science (Advances Concepts for Intelligent Vision Systems), vol. 6915, pp. 748-759, 2011. (Year: 2011).*
A. F. Said, "Robust and Accurate Objects Measurement in Real-World Based on Camera System," 2017 IEEE Applied Imagery Pattern Recognition Workshop (AIPR), Washington, DC, USA, 2017, pp. 1-5, doi: 10.1109/AIPR.2017.8457954. (Year: 2017).*

(Continued)

*Primary Examiner* — Michael Robert Cammarata (57) ABSTRACT

A vehicle detection and collision alerting device and method is described. The vehicle detection device is used by a user to detect an approaching vehicle. The vehicle detection device may include a housing and a mount attached to the housing for securing the housing to the user or the users equipment. An optical sensor secured to the housing, facing generally outward. A processor is in communication with the optical sensor to receive data and execute an algorithm to analyze the received data. This algorithm is configured to determine the size and distance of the approaching vehicle and also calculate its velocity and trajectory. Alerting modules to alert the user and to alert the approaching vehicle are configured to receive signals from the processor when a potential collision is identified based on the data being processed.

16 Claims, 6 Drawing Sheets

(56) References Cited

U.S. PATENT DOCUMENTS

| | | | | |
|---|---|---|---|---|
| 11,776,383 | B1* | 10/2023 | Nguyen | G08B 21/182 |
| | | | | 455/404.2 |
| 2005/0004761 | A1* | 1/2005 | Takahama | G01S 17/931 |
| | | | | 348/148 |
| 2015/0228066 | A1* | 8/2015 | Farb | G06V 20/58 |
| | | | | 348/148 |
| 2015/0329045 | A1* | 11/2015 | Harris | B60Q 9/008 |
| | | | | 348/148 |
| 2017/0160392 | A1 | 6/2017 | Brisimitzakis | |
| 2018/0001952 | A1* | 1/2018 | Rajamani | B62J 45/41 |
| 2019/0186876 | A1* | 6/2019 | Howe | G01S 13/867 |
| 2019/0256162 | A1 | 8/2019 | Denholm et al. | |
| 2020/0020121 | A1* | 1/2020 | Rawashdeh | G06V 10/82 |
| 2020/0223506 | A1* | 7/2020 | Gilles | B62J 45/414 |
| 2021/0012663 | A1* | 1/2021 | Cooper | G08G 1/166 |
| 2021/0019897 | A1* | 1/2021 | Biswas | G06T 7/11 |
| 2021/0316723 | A1* | 10/2021 | Yamakawa | G01S 7/415 |
| 2021/0323546 | A1* | 10/2021 | Svensson | B60W 40/04 |
| 2021/0326608 | A1* | 10/2021 | Yoshimi | G06V 20/58 |
| 2022/0266835 | A1* | 8/2022 | Miyahara | B60W 40/02 |
| 2024/0247955 | A1* | 7/2024 | Schneider | H04N 5/33 |

OTHER PUBLICATIONS

C.-C. J. Hsu, M.-C. Lu and Y.-Y. Lu, "Distance and Angle Measurement of Objects on an Oblique Plane Based on Pixel Number Variation of CCD Images," in IEEE Transactions on Instrumentation and Measurement, vol. 60, No. 5, pp. 1779-1794, May 2011, doi: 10.1109/TIM.2011.2108076. (Year: 2011).*

M. Bertozzi, A. Broggi, M. Cellario, A. Fascioli, p. Lombardi, and M. Porta. Artificial vision in road vehicles. In Proceedings of the IEEE, vol. 90, pp. 1258-1271, 2002 (Year: 2002).*

Z. Sun, G. Bebis, and R. Miller. On-road vehicle detection using optical sensors: A review. In IEEE International Conference on Intelligent Transportation Systems, vol. 6, pp. 125-137, 2004 (Year: 2004).*

Salih Y., and Malik A., "Depth and Geometry from a Single 2D Image Using Triangulation", Proceedings of the IEEE International Conference on Multimedia and Expo Workshops (ICMEW) 2012, pp. 511-515, Melbourne, Australia, Jul. 2012. (Year: 2012).*

Boukhers, Zeyd, 3D Trajectory Extraction from 2D Videos for Human Activity Analysis (Logos Verlag Berlin 2017) ISBN: 978-3-8325-4583-3.

* cited by examiner

EFFICIENT COLLISION DETECTION AND ALERTING MODULE AND METHOD

RELATED APPLICATIONS

This application claims the benefit of priority to U.S. Provisional Application Ser. No. 63/170,709 entitled "Rear facing detection and alerting module and method" filed on Apr. 5, 2021, which application is hereby incorporated by reference herein in its entirety.

FIELD

The present inventive subject matter relates to the field of object detection. More specifically, the present inventive subject matter relates to moving vehicle detection for the avoidance of collisions.

BACKGROUND

Many cyclists, pedestrians, and motorcyclists are involved in vehicular collisions. The majority of collisions occur from the rear. The problem is increasing as drivers become more distracted. Existing methods help but are not sufficient enough. Some of the tools available today include reflectors, bright color clothes, mirrors, blinking lights, and even a light with built-in radar technology. With these tools available, the year 2020 saw the sharpest increase in cyclist deaths in decades. Most of the tools do not provide warnings and the tools that do suffer high false positives causing the cyclist to turn off the alerts. Additionally, none of the tools are able to detect a dangerous vehicle and record incidents.

BRIEF DESCRIPTION OF THE DRAWINGS

Embodiments of inventive subject matter may be best understood by referring to the following description and accompanying drawings, which illustrate such embodiments. In the drawings.

DESCRIPTION

In the following description, reference is made to the accompanying drawings that form a part hereof, and in which is shown by way of illustration specific embodiments which may be practiced. These embodiments are described in sufficient detail to enable those skilled in the art to practice the present subject matter, and it is to be understood that other embodiments may be utilized and that structural, logical and electrical changes may be made without departing from the scope of the present subject matter. The following description of example embodiments is, therefore, not to be taken in a limited sense, and the scope of the present invention is defined by the appended claims.

According to various embodiments of the inventive subject matter, a device which can intelligently detect approaching vehicles and provide a timely and effective alert to parties involved is beneficial. The device detects the approaching vehicle, alerts the driver of the vehicle of the cyclist through a changing pattern of vehicle facing lights, alerts the cyclist with an alert. In some examples, the device saves the video data of any incident or near miss for future reference or use. Current art relies on additional hardware, software, and larger batteries which makes its form factor unfit on bicycle and pedestrians for extended usage. According to various examples, the inventive subject matter improves on the current art by leveraging simpler camera arrangements and lower processing power algorithms.

Figure 1A:
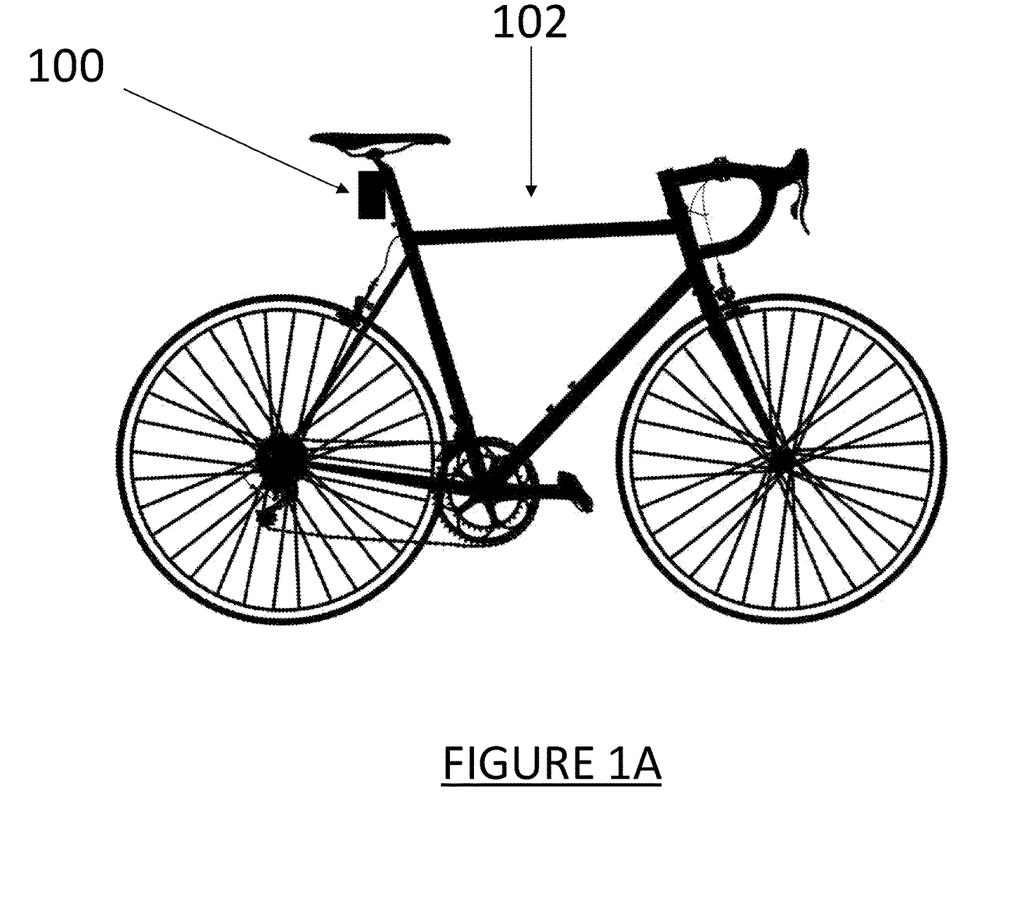
FIG. 1A is a side view of a detection and alerting module mounted on a bicycle.

FIG. 1A is a side view of a detection and alerting module 100 mounted on a bicycle 102. The detection and alerting module 100 can be mounted anywhere on the bicycle 102. Although, most collisions occur from behind the detection and alerting module 100 can face any direction. Additionally, multiple detection and alerting modules 100 may be used for protection in multiple directions.

Figure 1B:
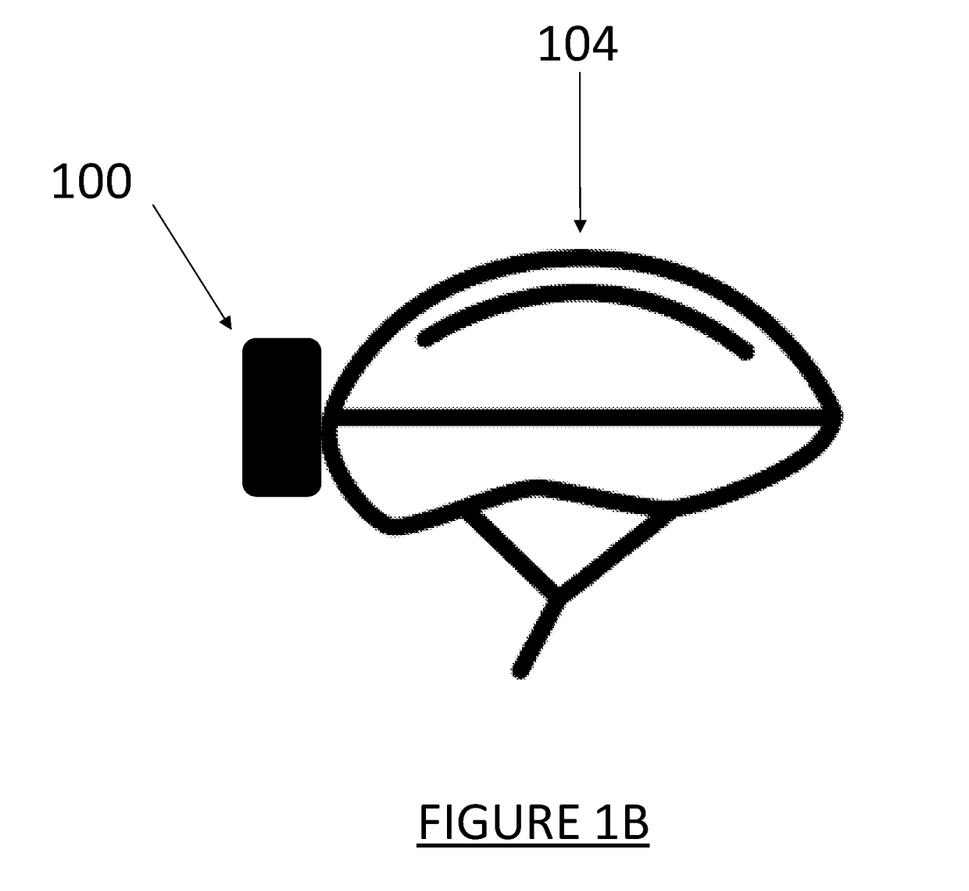
FIG. 1B is a side view of a detection and alerting module mounted on a helmet.

FIG. 1B is a side view of a detection and alerting module 100 mounted on a helmet 104. The detection and alerting module 100 can be mounted anywhere on the bicycle helmet 104 and face any direction for protection of the cyclist, though most collisions occur from behind. Additionally, multiple detection and alerting modules 100 may be used for protection in multiple directions.

Figure 1C:
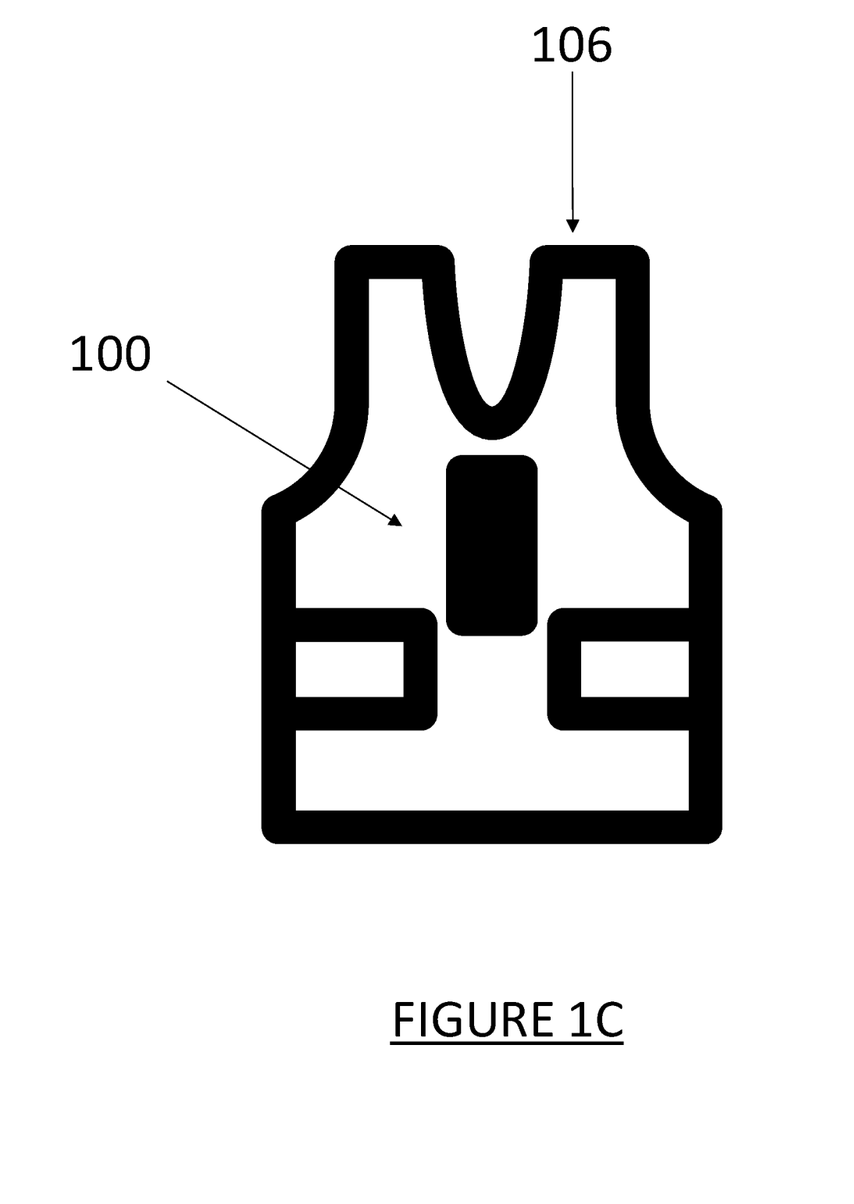
FIG. 1C is a front view of a detection and alerting module mounted on a wearable vest.

FIG. 1C is a front view of a detection and alerting module 100 mounted on a wearable vest 106. The detection and alerting module 100 can be mounted on the front or rear of the wearable vest 106, though most collisions occur from behind. Additionally, multiple detection and alerting modules 100 may be used for protection in multiple directions.

Figure 2:
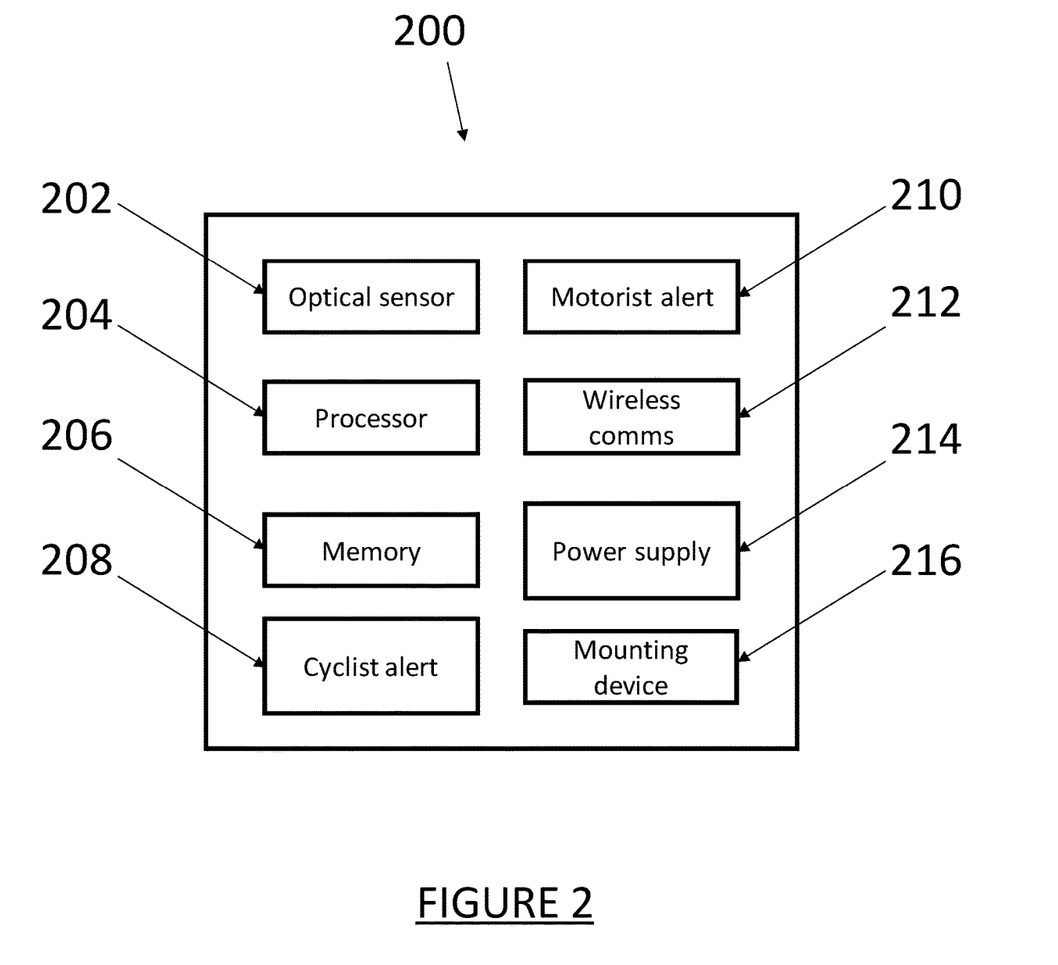
FIG. 2 is a block diagram of a detection and alerting module.

FIG. 2 is a block diagram of a detection and alerting module 200. The detection and alerting module 200 contains an optical sensor 202. The optical sensor 202 is used to gather images over time, or video. The data from optical sensor 202 is transferred to processor 204. In some examples, the processor 204 may be a separate module or central server. Processor 204 uses instructions stored in memory 206 to determine the relative position of the vehicle with respect to the cyclist. In some examples, the memory 206 may be embedded, removable, within a separate module, or within a central server. The cyclist alert 208 will warn the cyclist. In various examples the cyclist alert 208 may be visual, audio, haptic, or data within the device or as part of a separate module. A motorist alert 210 is used to warn the motorist. In various examples the motorist alert 210 may be visual, audio, or data within the device or as part of a separate module. Wireless comms 212 may be used to send alerts, video data, or collision event data to connected devices carried by the cyclist. In some examples, the wireless comms may be connected to multiple devices or a central server. The detection and alerting module 200 shall have a power supply 214 which may be powered by battery, a power supply onboard bicycle, or through energy harvesting. The detection and alerting module 200 shall be mounted to the bicycle, the bicycle helmet, or a wearable vest with a mechanical mounting device 216.

Figure 3:
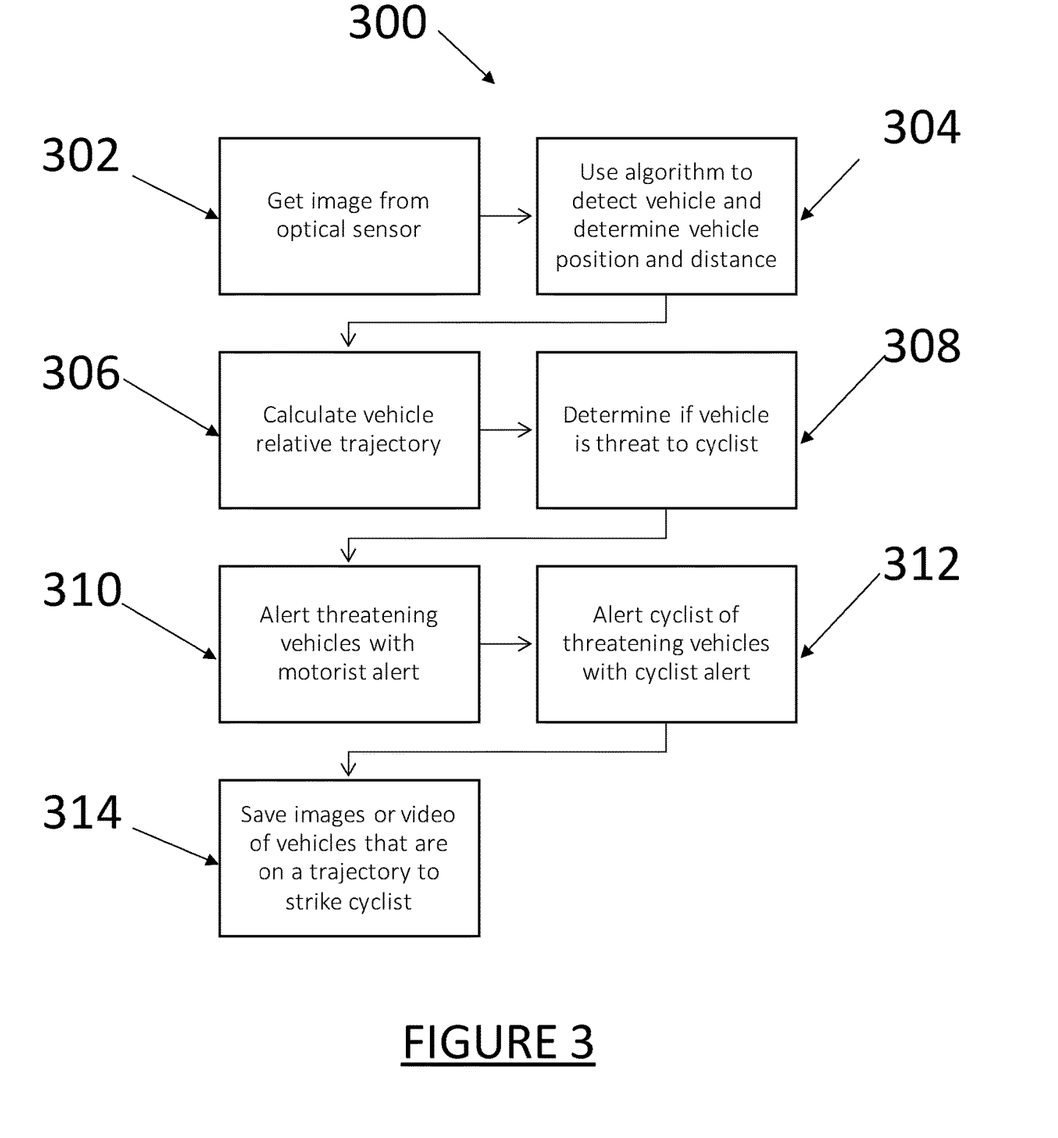
FIG. 3 is a flow diagram of a detection and alerting module process.

FIG. 3 is a flow diagram of a detection and alerting module process. Video data from the optical sensor is gathered and sent to processor 302. An algorithm is used to detect a vehicle in the image frame 304. The algorithm may include object detection, for example, using various computational models, including deep learning-based Convolutional Neural Networks (CNNs) employed to detect objects.

The algorithm is then used to determine vehicle position and vehicle distance 304. This determination is done quickly and in real time. In some examples, the algorithm determines the distance of the vehicle based on perspective length, known environmental dimensions or data, or focus of the camera module and detected vehicle. Known environmental dimensions or data include generalized and specific vehicle widths, lengths and/or heights, road widths, lane widths, cycle and pedestrian dimensions and the like. Generally, an output generated by object detection includes the size of the detected object relative to the image dimensions. The models typically provide bounding box coordinates, which determine the object's position and proportions concerning the entire frame. These measurements are fundamental in object tracking, spatial analysis, real-world scaling applications, and distance measurements. Triangle similarity is an example. In this example triangle similarity is defined as:

$$\text{Distance} = (W*F)/P$$

where W is the known physical width of the detected object in meters, F is the focal length of the camera which is obtained during a one-time calibration, and P is the width of the detected object in pixels which is represented by the bounding boxes. As additional video frames containing the detected vehicle are gathered the trajectory of the vehicle with respect to the cyclist can be determined 306. An object's velocity and path is generally determined using sequential position data and time intervals. Equations such as velocity=displacement/time and trajectory analysis methods, are integral to kinematics and motion estimation. Additional implementations may integrate predictive modeling, Kalman filtering, and AI-driven motion tracking techniques. The principles of motion calculation, include, for example.

$$v = \Delta x / \Delta t$$

with $\Delta x$ being change in distance and $\Delta t$ being change in time. The above equation is in a single axis and can easily be applied in 3 axis to gain the trajectory:

$$v = dx/dt\ i + dy/dt\ j + dz/dt\ k.$$

The algorithm is able to determine if the vehicle is a collision threat to the cyclist based upon a predetermined set of criteria 308 or the probability of the collision. These criteria may be predetermined or be developed on board over time and may change over time or in different operating conditions. The criteria may include vehicle relative speed, vehicle relative course, vehicle relative position, and/or time until impact. In some examples, the algorithm may determine the likelihood of the driver being distracted or impaired or the probability of collision. In the event of a vehicle being determined to be a threat, the motorist alert 310 and cyclist alert 312 will be initiated. These alerts may occur simultaneously, or in any sequential order. Additionally, these alerts may change in intensity depending on the level of threat the vehicle presents to the cyclist. In the event of a vehicle being determined a threat, video data may be saved to memory 314. The video may be saved continuously, when a threat has been determined based upon a set of criteria, or at any specified time. The duration of the video saved may also be changed. In some examples, the video data may be transferred over wireless comms to a separate device, emergency contact, or first responders.

Figure 4:
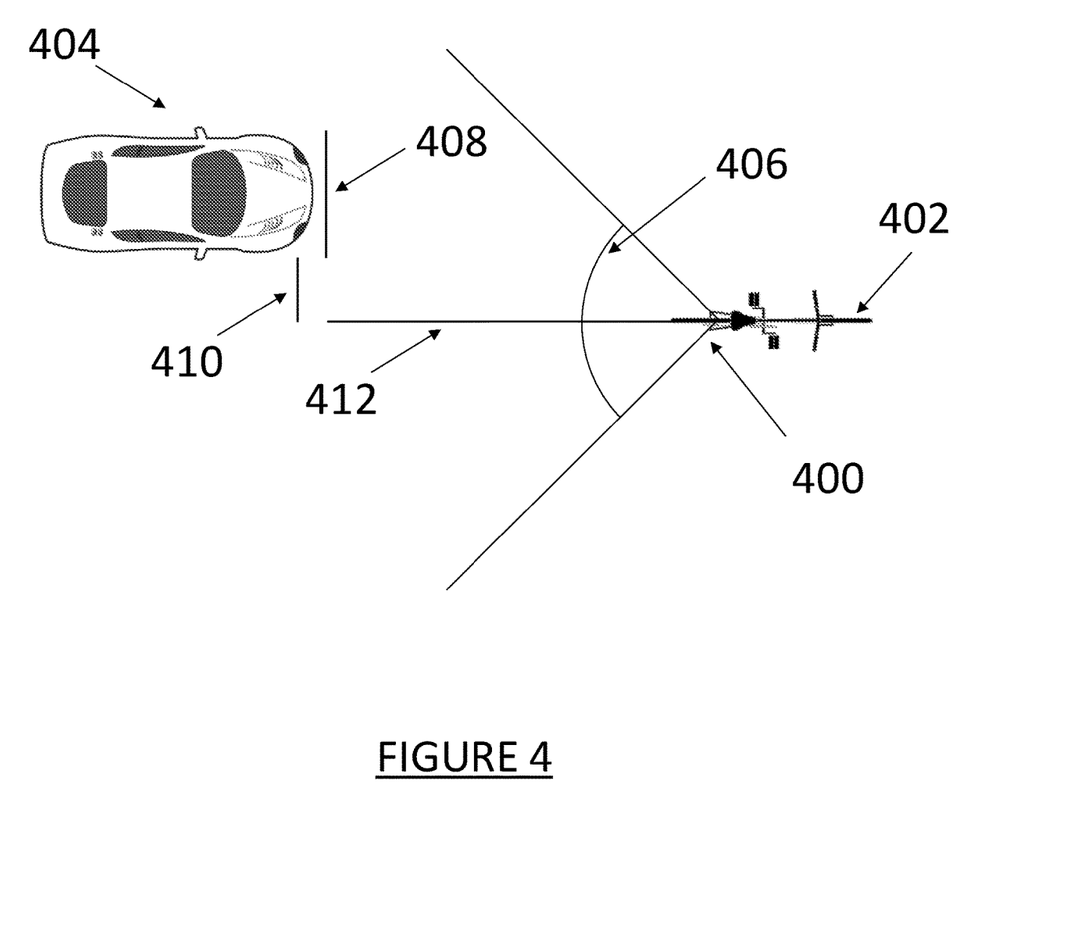
FIG. 4 is top view of a detection and alerting module mounted on a bicycle with an approaching vehicle.

FIG. 4 is top view of a detection and alerting module 400 mounted on a bicycle 402 with an approaching vehicle 404. The detection and alerting module 400 has an embedded camera with a field of view angle 406. After the algorithm detects a vehicle, the vehicle width 408 and lateral distance 410 between the cyclist and vehicle is determined using an additional algorithm. The vehicle distance 412 may be determined using the field of view angle 406 and vehicle width 408 in an example algorithm type. In other algorithm types the vehicle distance is determined as a function of the algorithm. The lateral distance 410 and vehicle distance 412 between video frames is used to determine the relative trajectory of the vehicle.

Embodiments of the invention described in the above paragraphs and examples may be applied for bicyclists, pedestrians, motorcyclists, automobiles and other modes of transportation which may be at risk of collision from approaching automobiles.

Thus, example embodiments of the inventive subject matter are disclosed. One skilled in the art will appreciate that the present teachings can be practiced with embodiments other than those disclosed. The disclosed embodiments are presented for purposes of illustration and not limitation, and the present teachings are limited only by the claims that follow.

The Abstract is provided to comply with 37 C.F.R. § 1.72 (b) to allow the reader to quickly ascertain the nature and gist of the technical disclosure. The Abstract is submitted with the understanding that it will not be used to interpret or limit the scope or meaning of the claims.

What is claimed is:

1. A detection device for use by a user to detect an approaching vehicle, the detection device comprising:
   a housing;
   a mount attached to the housing for securing the housing;
   an optical sensor secured to the housing, the optical sensor facing outward from the housing;
   a processor in communication with the optical sensor, the processor to receive data from the optical sensor, the processor to analyze the received data from the optical sensor, wherein the processor is configured to determine the size and distance of the approaching vehicle using known environmental dimensions;
   a user alerting module in communication with the processor, the user alerting module configured to cause an alert to be delivered to the user; and
   a vehicle alerting module in communication with the processor, the vehicle alerting module configured to cause an alert to be delivered to the approaching vehicle;
   wherein the processor uses the determined vehicle size and distance with additional data from the optical sensor to calculate the velocity and trajectory of the approaching vehicle;
   wherein the processor uses the distance, velocity and trajectory of the approaching vehicle to identify a potential collision with the user;
   wherein the processor determines the velocity, and trajectory of the approaching vehicle using lateral distance between the vehicle and the detection device and vehicle rearward distance from the detection device, between video frames based on data from only one optical sensor.

2. The detection device of claim 1, wherein the processor uses the distance, velocity and trajectory of the approaching vehicle to identify whether the approaching vehicle is being driven in a manner which increases the probability of collision.

3. The detection device of claim 1, wherein the processor sends a signal to the vehicle alerting module when a potential collision with the user is identified.

4. The detection device of claim 1, wherein the processor sends a signal to the user alerting module when a potential collision with the user is identified.

5. The detection device of claim 1, further comprising a memory to store optical recordings of the approaching vehicle.

6. The detection device of claim 1, wherein the optical sensor is a video camera.

7. A method for detecting an approaching vehicle comprising:
- capturing image data at an optical sensor facing away from a user, the image data including the approaching vehicle;
- analyzing the image data in real time using known environmental data to determine the distance between the user and the approaching vehicle;
- calculating the approaching vehicle trajectory by analyzing additional captured image data;
- calculating the approaching vehicle velocity by analyzing additional captured image data;
- identifying a potential collision between the approaching vehicle and the user; and
- causing an alert based on the identification of a potential collision;
- wherein analyzing the image data includes using lateral distance between the vehicle and the user and vehicle rearward distance from the user based on image data from only a single optical sensor.

8. The method of claim 7, wherein capturing image data includes video capture and the image data comprises one or more frames in the video capture.

9. The method of claim 8, further comprising saving the video capture to a memory for later retrieval.

10. The method of claim 7, wherein the known environmental data includes the approximate size of the approaching vehicle.

11. The method of claim 7, further comprising analyzing the approaching vehicle trajectory, the approaching vehicle velocity and the distance between the user and the approaching vehicle to identify a potential collision.

12. The method of claim 7, wherein analyzing the image data includes making assumptions about the approaching vehicle size.

13. The method of claim 7, wherein the approaching vehicle distance and the approaching vehicle velocity are determined without measuring the approaching vehicle size.

14. A system for detecting a vehicle approaching a user, the system comprising:
- a camera for capturing video including the vehicle;
- a memory to store known environmental data;
- a processor to receive video data from the camera and to retrieve the known environmental data from the memory, the processor to use the video data and the known environmental data to determine the vehicle position with respect to the user, the processor to further determine the vehicle velocity and the vehicle trajectory based on the video data and the known environmental data;
- an alert module to generate an alert,
- wherein the processor sends a signal to the alert module when the vehicle velocity, the vehicle trajectory and the vehicle position with respect to the user indicate a potential collision;
- wherein the processor determines the vehicle position with respect to the user using lateral distance between the vehicle and the user and vehicle rearward distance from the user, based on receiving a single feed of video data.

15. The system of claim 14, wherein the known environmental data includes vehicle size data.

16. The system of claim 14, further comprising a communication module in communication with the alert module to send alerts to the user using wireless communication.

* * * * *